US012761622B2

(12) United States Patent
Lee et al.

(10) Patent No.: US 12,761,622 B2
(45) Date of Patent: Oct. 13, 2026

(54) DEVICE FOR PERFORMING INTELLIGENT LINE PROCESS, SYSTEM INCLUDING THE SAME, AND METHOD THEREFOR

(71) Applicants: HYUNDAI MOTOR COMPANY, Seoul (KR); Kia Corporation, Seoul (KR)

(72) Inventors: Dae Won Lee, Gunpo-si (KR); Jin Myeong Kang, Seoul (KR); Sung Hwan Seo, Suwon-si (KR); Jong Ub Suk, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 652 days.

(21) Appl. No.: 18/214,105

(22) Filed: Jun. 26, 2023

(65) Prior Publication Data

US 2024/0201647 A1 Jun. 20, 2024

(30) Foreign Application Priority Data

Dec. 15, 2022 (KR) ........................ 10-2022-0176133

(51) Int. Cl.
*G05B 19/05* (2006.01)

(52) U.S. Cl.
CPC ......... *G05B 19/056* (2013.01); *G05B 19/052* (2013.01); *G05B 19/058* (2013.01)

(58) Field of Classification Search
CPC .. G05B 19/056; G05B 19/052; G05B 19/058; G05B 19/054; G05B 2219/1103;
(Continued)

(56) References Cited

U.S. PATENT DOCUMENTS

| | | | | |
|---|---|---|---|---|
| 2019/0086894 A1* | 3/2019 | Tenorth | ................ | G05B 19/042 |
| 2022/0187831 A1 | 6/2022 | Park et al. | | |
| 2022/0350308 A1* | 11/2022 | Reitinger | ............. | G05B 19/042 |

FOREIGN PATENT DOCUMENTS

| | | |
|---|---|---|
| JP | 2005-339481 A | 12/2005 |
| JP | 2020-522812 A | 7/2020 |

(Continued)

OTHER PUBLICATIONS

Wenhao Liu, "A kind of Internet of Things management method and Internet of Things management platform based on PLC" (english translation of CN107370833A), Nov. 21, 2017, ip.com machine translation (Year: 2017).*

(Continued)

*Primary Examiner* — Christopher W Carter
(74) *Attorney, Agent, or Firm* — MORGAN, LEWIS & BOCKIUS LLP

(57) ABSTRACT

A device for performing an intelligent line process, a system including the same, and a method therefor, includes a PLC system configured for managing line operation, an intellectualizing service module configured for identifying information transmitted from the PLC system to define an action and transmitting information on the action to the PLC system, and a relay module configured for providing an interface by establishing communication between the PLC system and the intellectualizing service module. The information transmitted from the PLC system is data about a current state, and the information on the action is data about a recommended action for the current state. The relay module is configured to connect the PLC system and the intellectualizing service module to each other via the communication, and the communication includes Ethernet communication and Modbus.

18 Claims, 16 Drawing Sheets

(58) Field of Classification Search
CPC ................ G05B 19/05; G05B 19/4183; G05B 19/41865; G05B 19/41885; G05B 2219/24215
See application file for complete search history.

(56) References Cited

FOREIGN PATENT DOCUMENTS

| | | | |
|---|---|---|---|
| KR | 10-2007-0079676 | A | 8/2007 |
| KR | 10-1722856 | B1 | 4/2017 |
| KR | 10-2021-0054711 | A | 5/2021 |

OTHER PUBLICATIONS

Jingpei Yang, "Systems and methods for log coordination" (English translation of WO2015069788A1), May 14, 2015, ip.com machine translation (Year: 2015).*
Zhitao Feng, "PLC communication system based on OPCUA and interaction method thereof" (English translation of CN114629948A), Jun. 14, 2022, ip.com machine translation (Year: 2022).*

* cited by examiner

| DIVISION | CONTENT | PLC ADDRESS | SCADA ADDRESS |
|---|---|---|---|
| PLC→python CURRENT STATE | PROCESS 10 FACILITY VEHICLE TYPE | DB153.DBD00 | 40001 |
| | PROCESS 10 BOGIE NUMBER | DB153.DBD04 | 40003 |
| | STATE: 0,1,2,5 | DB153.DBD104 | 40029 |
| PLC←python | PYTHON ACTION<br>0: NO ACTION.<br>1: 10→20 MOVEMENT<br>2: 20→30 MOVEMENT | DB153.DBD120 | 40031 |
| | STATE: 3,4,6 | DB153.DBD150 | 40033 |

RELAY MAPPING (PLC ADDRESS, SCADA ADDRESS)

| DIVISION | CONTENT | PLC ADDRESS | SCADA ADDRESS |
|---|---|---|---|
| PLC→python CURRENT STATE | PROCESS 10 MODEL | DB153,DBD00 | 40001 |
| | PROCESS 10 BOGIE NUMBER | DB153,DBD04 | 40003 |
| | PROCESS 20 MODEL | DB153,DBD10 | 40005 |
| | PROCESS 20 BOGIE NUMBER | DB153,DBD14 | 40007 |
| | STATE: 0, 1, 2, 5 | DB153,DBD140 | 40029 |
| PLC→python | PYTHON ACTION<br>0: NO ACTION.<br>1: 10→20 MOVEMENT<br>2: 20→30 MOVEMENT<br>3: 30→40 MOVEMENT<br>4: 40→50 MOVEMENT<br>5: 50→LOWER4 MOVEMENT<br>6: LOWER4→LOWER2 MOVEMENT<br>7: LOWER2→10 MOVEMENT | DB153,DBD120 | 40031 |
| | STATE: 3, 4, 6 | DB153,DBD150 | 40033 |

FIG.12

DEVICE FOR PERFORMING INTELLIGENT LINE PROCESS, SYSTEM INCLUDING THE SAME, AND METHOD THEREFOR

CROSS-REFERENCE TO RELATED APPLICATION

The present application claims priority to Korean Patent Application No. 10-2022-0176133, filed on Dec. 15, 2022, the entire contents of which is incorporated herein for all purposes by this reference.

BACKGROUND OF THE PRESENT DISCLOSURE

Field of the Present Disclosure

The present disclosure relates to a device for a vehicle process, a system including the same, and a method therefor, and more particularly, to a device for performing an intelligent line process, a system including the same, and a method therefor.

Description of Related Art

A need and a diversity of application of an industrial robot to a manufacturing line are gradually expanding because of development of a technology. Furthermore, an automation system technology that ensures productivity improvement and energy efficiency and an operating plan for a production process are increasing from various perspectives based on needs of a system customer and a consumer. Introduction and construction of the automation system for improving the productivity in industrial and technological worlds are acting as important industrial factors even considering national and international market competition.

Accordingly, the present disclosure is to propose a sustainable line process technology for the productivity improvement and a satisfying customer service. Therefore, the present disclosure is to provide a process method for improving the productivity that contributes to time saving and energy loss prevention and to propose a technology of the automation system using the same.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device for performing an intelligent line process, a system including the same, and a method therefor.

Another aspect of the present disclosure provides a device for operating a vehicle body plant intellectualizing platform system, a system including the same, and a method therefor.

Another aspect of the present disclosure provides a device for applying an intellectualizing interface between a PLC system and an intellectualizing service module, a system including the same, and a method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for performing an intellectualizing process includes a PLC system configured for managing line operation, an intellectualizing service module configured for identifying information transmitted from the PLC system to define an action and transmitting information on the action to the PLC system, and a relay module configured for providing an interface by establishing communication between the PLC system and the intellectualizing service module, the information transmitted from the PLC system is data about a current state, and the information on the action is data about a recommended action for the current state, and the relay module is configured to connect the PLC system and the intellectualizing service module to each other via the communication, and the communication includes Ethernet communication and Modbus.

In an exemplary embodiment of the present disclosure, the relay module may use a program for performing supervisory control and data acquisition (SCADA) to transfer the data between the PLC system and the intellectualizing service module, the relay module and the intellectualizing service module may be in communication with each other via the Modbus, and the relay module may become a server of the Modbus and the intellectualizing service module may become a client of the Modbus.

In an exemplary embodiment of the present disclosure, the intellectualizing service module may define coordinate values for respective processes and define an index corresponding to each of the coordinate values, and the index may be defined as an index distinguished corresponding to actions of a travel area and a storage area.

In an exemplary embodiment of the present disclosure, the intellectualizing service module may identify the current state and a target state transmitted from the PLC system and identify the shortest path, and deliver an index suitable for the corresponding states to the PLC system.

In an exemplary embodiment of the present disclosure, the intellectualizing service module may construct a tree structure for actions and states for the current state and identify the shortest path.

In an exemplary embodiment of the present disclosure, the intellectualizing service module may operate at least one of Python algorithms, C++ algorithms, and advanced algorithms considering application of an advanced automation system and an AI/ML technology.

In an exemplary embodiment of the present disclosure, the PLC system may transmit data on the current state including a bogie type and a bogie number for each cell to the intellectualizing service module, and receive the recommended action corresponding to the data on the current state from the intellectualizing service module, add the recommended action to a ladder, and perform the action.

In an exemplary embodiment of the present disclosure, the PLC system may receive sequence indication data via a manufacturing execution system (MES).

In an exemplary embodiment of the present disclosure, the PLC system may be connected to a peripheral facility and a robot via a communication card, and an input card may be connected to a sensor and an output card may be connected to a solenoid valve and a motor.

In an exemplary embodiment of the present disclosure, the PLC system may load the ladder and a sequential function chart (SFC) program to control the robot, the peripheral facility, the solenoid valve, and the motor based on the sequence indication data.

In an exemplary embodiment of the present disclosure, the communication may include Ethernet communication and Modbus.

According to another aspect of the present disclosure, a method for performing an intellectualizing process includes transmitting, by a PLC system, information on a current state and a target state to an intellectualizing service module, identifying, by the intellectualizing service module, the current state and the target state of the PLC system via the information, determining an action corresponding to the information, and transmitting information on the action to the PLC system, executing, by the PLC system, the action based on the information on the action and transmitting action identification information including the completed current state and the target state to the intellectualizing service module, and transmitting, by the intellectualizing service module, accuracy information on a result of the action to the PLC system corresponding to the action identification information.

In an exemplary embodiment of the present disclosure, the information on the current state and the target state may include a bogie type and a bogie number for each cell identified by the PLC system.

In an exemplary embodiment of the present disclosure, the information on the action may include information on a shortest path determined by identifying the current state and the target state.

In an exemplary embodiment of the present disclosure, the information on the action may include identifying of the shortest path by constructing a tree structure for actions and states for the current state.

In an exemplary embodiment of the present disclosure, the information on the action may define coordinate values for respective processes and define an index corresponding to each of the coordinate values, and the index may be defined as an index distinguished corresponding to actions of a travel area and a storage area.

In an exemplary embodiment of the present disclosure, the information on the action may include delivering of an index suitable for corresponding states.

In an exemplary embodiment of the present disclosure, the method may further include identifying, by the PLC system, that the current state matches the target state by identifying the accuracy information on a result of the action transmitted from the intellectualizing service module.

In an exemplary embodiment of the present disclosure, the intellectualizing service module may operate at least one of Python algorithms, C++ algorithms, and advanced algorithms considering application of an advanced automation system and an AI/ML technology.

In an exemplary embodiment of the present disclosure, the method may further include connecting the PLC system and the intellectualizing service module to each other via communication, the communication may include Ethernet communication and Modbus, the connecting of the PLC system and the intellectualizing service module to each other may involve a relay module to transfer data between the PLC system and the intellectualizing service module, and the relay module may use a program for performing supervisory control and data acquisition (SCADA), the relay module and the intellectualizing service module may be in communication with each other via the Modbus, and the relay module may become a server of the Modbus and the intellectualizing service module may become a client of the Modbus.

In an exemplary embodiment of the present disclosure, the method may further include writing, by the PLC system, a PLC address, generating, by the relay module, an address of the relay module from the PLC address, and transmitting the address of the relay module, and the intellectualizing service module may become the client of the Modbus and read data on the address of the relay module to identify the PLC address.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 11 and FIG. 12 are diagrams illustrating an intellectualizing procedure using an interface between a PLC and an intellectualizing service module according to an exemplary embodiment of the present disclosure;

Figure 1:
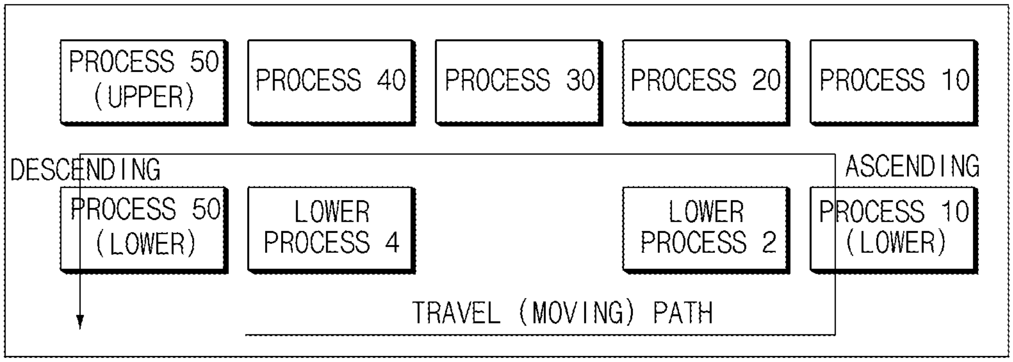
FIG. 1 and FIG. 2 are diagrams schematically illustrating a structure of a linear system to which the present disclosure is applied.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various embodiments of the present disclosure will be described in detail with reference to FIGS. 1 to 14.

Figure 2:
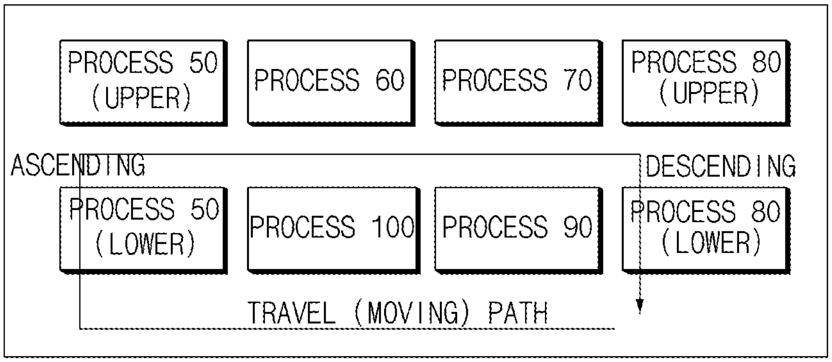

FIG. 1 and FIG. 2 are diagrams schematically illustrating a structure of a linear system to which the present disclosure is applied. The linear system to which the present disclosure is applied includes a component for determining whether to move to a manufacturing line or to a storage line in consideration of bogie data information and next manufacturing data information.

Referring to FIG. 1 and FIG. 2, manufacturing of a vehicle body is the most automated field in automobile production. To manufacture the vehicle body, a process line is able to be built with a jig for welding, a bogie for transporting/welding a product, a robot, and the like. Furthermore, the vehicle bodies may be manufactured in a form (mixed models) in which 3 to 4 models are mixed with each other in one plant. Hereinafter, in a technology to which the present disclosure is applied, a linear line system including first and second floors (ascending and descending) of target side complex lines will be referred to as an example. Linear lines may be divided into the manufacturing line and the storage line.

As an exemplary embodiment of the present disclosure, the bogie moves from a process 10 to a process 50, and the robot welds the product in each bogie. When the bogie arrives at the process 50, a programmable logic controller (PLC) system is configured to determine whether to transmit the process 50 bogie to a process 60 or to a lower process 4 by reading next sequence indication data. When the next manufacturing data information is different from the process 50 bogie, the process 50 bogie moves to the storage process 60 in the second floor. On the other hand, when the next manufacturing data information is the same as the process 50 bogie, the bogie moves to the first floor via a lifter and then to the lower process 4.

In other words, when one model is continuous in manufacturing execution system (MES) manufacturing data, the bogie circulates in a path of 10→20→30→40→50→lower4→lower2→10. When four, which is the number of bogies, or more vehicle bodies are produced, all linear cells in the manufacturing line are filled with one type of bogies. On the other hand, when the MES manufacturing data exhibits a process of changing from a model A to a model B, the bogie moves to the process 10→20→30→40→50 and then to the storage line process 60. This is as shown in FIG. 2. Thereafter, the bogie moves to 60→70→upper80→lower80→90→100 independently of the manufacturing line. A previously existed process 100 bogie moves to a lower process 50, so that a bogie in a storage goes into a travel line. When changing the model, a travel bogie moves to the storage, and a storage bogie moves to the travel line.

Figure 3A:
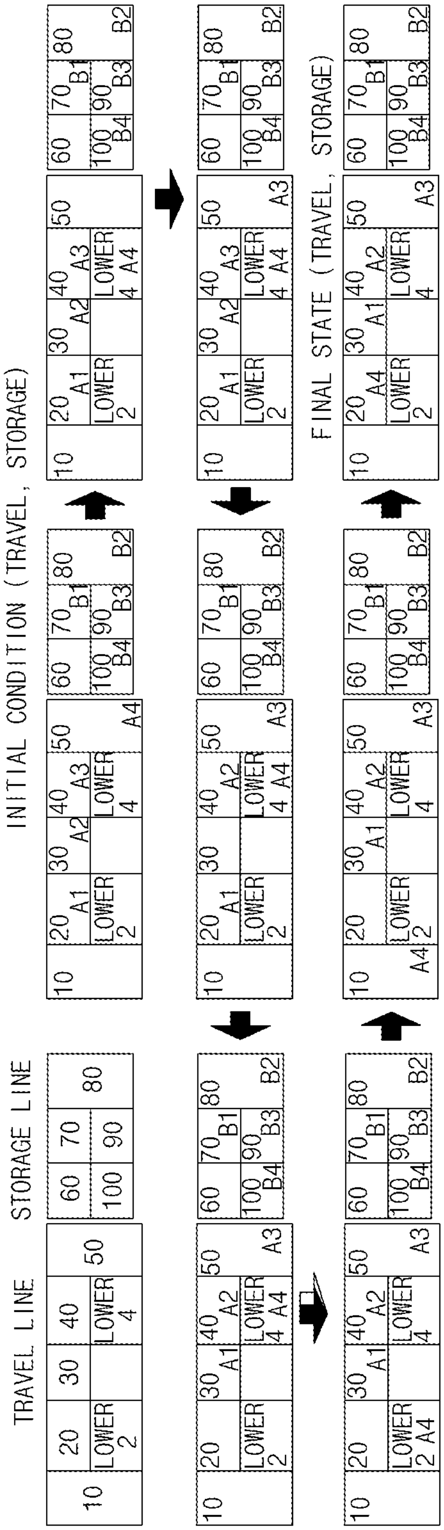
FIG. 3A and FIG. 3B are diagrams schematically illustrating a concept of performing line adjustment to which the present disclosure is applied.
Figure 3B:
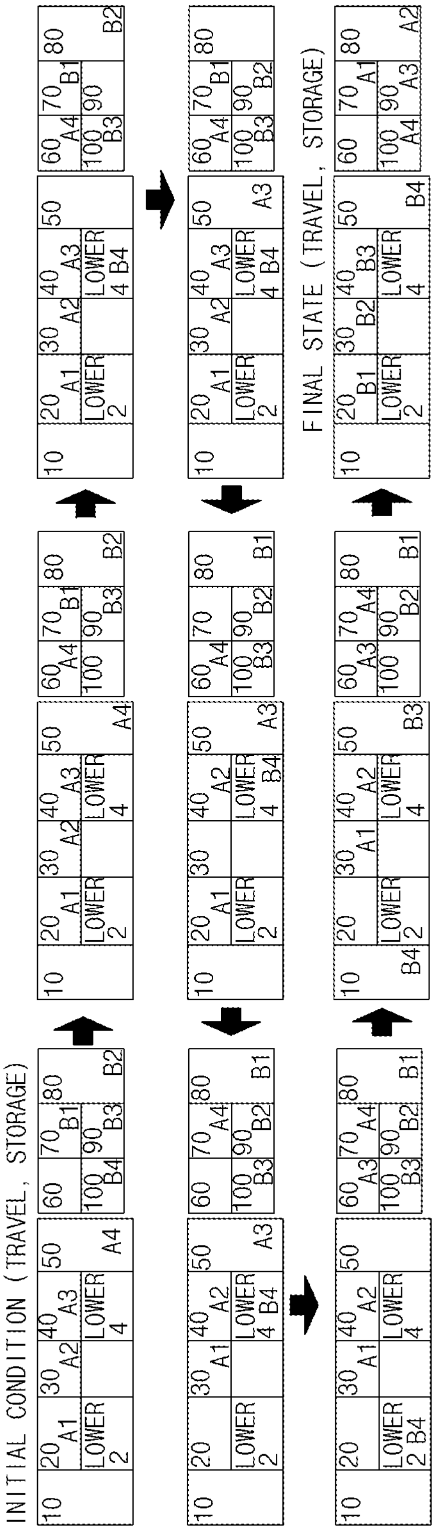

FIG. 3A and FIG. 3B are diagrams schematically illustrating a concept of performing line adjustment to which the present disclosure is applied.

Referring to FIG. 3A, line interruption occurs when sequence indication of complex data is made in regular manufacturing. Therefore, it is necessary to adjust the sequence indication to be simple based on a line situation. Thus, PLC programming focuses on a few simple cases that take up most of the time.

For example, when operating a total of two models, the models A and B, the bogies are operated by being respectively assigned with numbers 1 to 4. Because one inverter is used for each area, only one bogie moves in the same area. When a layout is allocated based on a matrix, the layout may be expressed as shown in FIG. 3. Here, processes 10, 50, and 80 are lifter processes, and only one bogie is able to enter (be allocated to) each of the processes 10, 50, and 80, so that the processes 10, 50, and 80 are illustrated in a form of combining two rows. In this regard, when the model A is indicated under an arbitrary initial condition, an order in FIG. 3A is changed to a form below.

For the model A, as each bogie circulates in the path of 10→20→30→40→50→lower4→lower2→10, the bogies move in an order of 20(A1)→30(A2)→40(A3)→50(A4)/20(A1)→30(A2)→40(A3)→lower4(A4)/20(A1)→30(A2)→50(A3)→lower4(A4)/20(A1)→40(A2)→50(A3)→lower4(A4)/30(A1)→40(A2)→50(A3)→lower4(A4)/30(A1)→40(A2)→50(A3)→lower2(A4)/30(A1)→40(A2)→50(A3)→10(A4))/20(A4)→30(A1)→40(A2)→50(A3).

On the other hand, when the sequence indication is made from the model A to the model B, a travel line bogie moves to the storage and a storage line bogie moves to the travel line, as shown in FIG. 3B. As described, after moving to the process 10→20→30→40→50, the bogie moves to the storage line process 60, then to 60→70→upper80→lower80→90→100 independently of the manufacturing line. Because the travel line and the storage line control individual inverters, the bogies of the respective areas move independently of each other.

Accordingly, the bogies of the model A and the model B move in an order of 20(A1)→30(A2)→40(A3)→50(A4)/70(B1)→80(B2)→90(B3)→100(B4)/20(A1)→30(A2)→40

(A3)→60(A4)/70(B1)→80(B2)→90(B3)→50(B4)/20(A1)→30(A2)→40(A3)→60(A4)/70(B1)→80(B2)→100(B3)→lower4(B4)/20(A1)→30(A2)→50(A3)→60(A4)/70(B1)→90(B2)→100(B3)→lower4(B4)/20(A1)→40(A2)→50(A3)→60(A4)/80(B1)→90(B2)→100(B3)→lower4(B4)/30(A1)→40(A2)→50(A3)→70(A4)/80(B1)→90(B2)→100(B3)→lower4(B4)/30(A1)→40(A2)→60(A3)→70(A4)/80(B1)→90(B2)→100(B3)→lower2(B4)/30(A1)→40(A2)→60(A3)→70(A4)/80(B1)→90(B2)→50(B3)→10(B4)/ . . . 20(B1)→30(B2)→40(B3)→50(B4)/70(A1)→80(A2)→90(A3)→100(A4).

A PLC programmer writes a ladder program to move the bogies in the above order without a time delay. A total of eight bogies must be respectively located in specific cells, so that the number of all cases is high, but a test operator writes the program only for the regular manufacturing, which is a condition that usually occurs. As shown in FIG. 3B, when the sequence indication is A→A-B→B, the bogies are mixed with each other in the travel line and the storage line. The ladder program does not respond to such case, so that there always is a constraint that the number of sequence indications is greater than the number of bogies. The PLC programmer writes the program by considering only one-step movement of automatic operation. In this regard, each movement condition may be referred to as in <Table 1>.

TABLE 1

| Area | Cell operation | Movement condition |
|---|---|---|
| Travel area | 10->20 movement<br>20->30 movement | Previous process work completed, exists. |
| | 30->40 movement<br>40->50 movement | Subsequent process bogie does not exist. |
| | Lower4->lower2 movement<br>Lower2->10 movement | Previous process bogie exists, subsequent process bogie does not exist |
| | 50->60 movement | In case next manufacturing model and process 50 model are different |
| | 50->lower4 movement | In case next manufacturing model and process 50 model are same |
| Storage area | 60->70 movement<br>70->80 movement<br>80->90 movement<br>90->100 movement | Previous process bogie exists, subsequent process bogie does not exist |
| | 100->50 movement | In case next manufacturing model and process 50 model are different |

The reason why the movement condition is not complicated as shown in <Table 1> is that the sequence indication is simple. When a program that can respond to all sequence indications is written, a continuous operation (10→20 movement, 20→30 movement, and 70→80 movement) based on each state must be written. Furthermore, because the PLC ladder does not correspond thereto, an operator must think of an action suitable for a specific condition and manually perform an action suitable for a state. A proficiency of the operator largely determines a line interruption duration and a duration to meet the condition. Accordingly, such operation scheme may consider following error situations. This will be described with reference to FIG. 4A and FIG. 4B.

Figure 4A:
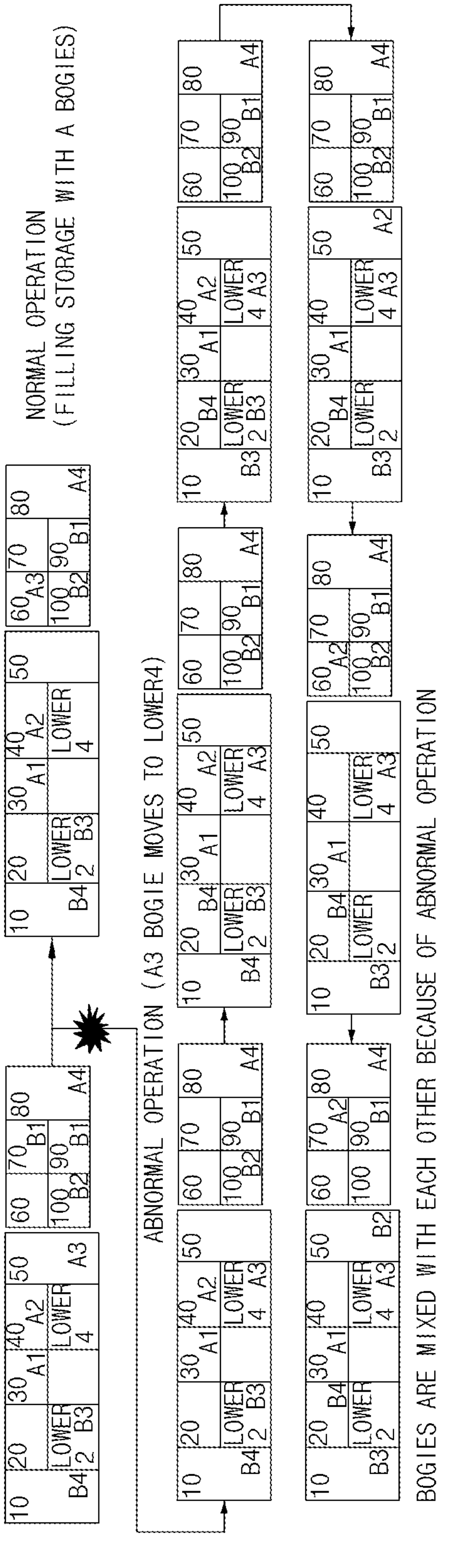
FIG. 4A and FIG. 4B are diagrams illustrating error situations which may occur in a linear system environment to which the present disclosure is applied as an example.
Figure 4B:
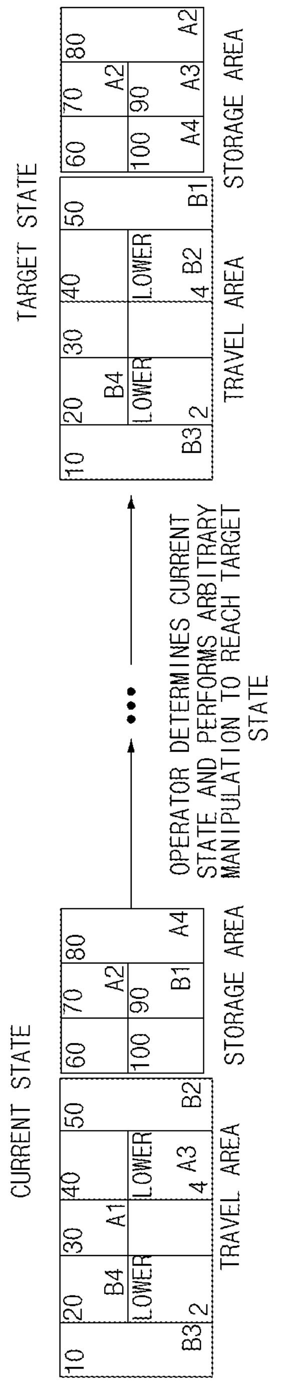

FIG. 4A and FIG. 4B are diagrams illustrating error situations which may occur in a linear system environment to which the present disclosure is applied as an example.

Referring to FIG. 4A, a case in which, 1. in a situation in which the bogie of the model A received the sequence indication has moved to the process 50 and then a model B sequence indication is made, 2. because the sequence indication vehicle model is B and the vehicle model of the process 50 bogie is A, the process 50 bogie should move 50→60, but 3. the bogie moves 50→lower4 because of a process 50 specification detection fault, and the PLC is impossible to determine this as an abnormality in a movement time point, and then, 4. three bogies of the model B sequentially receive the sequence indication is referred to as an example. In this regard, because of the bogie A3 incorrectly moved in the step 3, the sequence indication and the bogie arriving at the process 10 do not match each other, so that an error may occur.

Accordingly, when the error occurs because of the mixing of the bogies, the operator aligns the bogies via determination→manual manipulation. This is as shown in FIG. 4B. When the bogies are mixed with each other and a current state is 30(A1)→70(A2)→lower4(A3)→80(A4)/90(B1)→50(B2)→10(B3)→20(B4), the operator 1. identifies the current state, and 2. until setting the target state, 3. performs arbitrary manipulation. Here, in the target state setting, the storage area is filled with the bogies and the travel area is filled with the B bogies. At the instant time, it is complicated to consider which number bogie the operator puts in which cell, and it is assumed that the operator selects the target state in FIG. 4B.

Accordingly, the operator repeats loop operations below. L1. Choose an action to move the bogie. As an exemplary embodiment of the present disclosure, fill the A1 bogie in the process 40. L2. Execute an operation distinguished for each cell. Move the A1 bogie to the process 40 by the 30→40 movement. L3. Determine whether the current state and the target state are the same as each other. When the current state and the target state are different from each other, maintain the loop operation. On the other hand, when the current state and the target state are the same as each other, exit the corresponding loop operation. In this regard, a skilled operator can set a target state which may be reached most rapidly from the current state. However, an operator with low proficiency has to perform many unnecessary operations. The operator with the low proficiency may even perform a wrong action while performing a target operation because of a low level of understanding of the line. In such case, a problem in which the line is interrupted for a long time occurs.

<Table 2> below defines actions that the operator may perform.

TABLE 2

| Area | Cell operation |
|---|---|
| Travel area | 10->20 movement<br>20->30 movement<br>30->40 movement<br>40->50 movement<br>Lower4->lower2 movement<br>Lower2->10 movement<br>50->60 movement<br>50->lower4 movement |
| Storage area | 60->70 movement<br>70->80 movement<br>80->90 movement<br>90->100 movement<br>100->50 movement |

As defined in <Table 2> above, the operator may consider a series of actions in relation to the current state, and perform the operation distinguished for each state to reach the desired target state without the error.

On the other hand, the PLC has a limitation in that response programs for all cases cannot be input because of lack of memory. Furthermore, even when the input is possible, there is a restriction that the test operator cannot guarantee coverage of all of the cases. Furthermore, from the point of view of the line interruption, a small mistake occurred in the line leading to the long interruption may only be determined as an unstable system. Therefore, as a method to prevent the small mistake from causing the long interruption, a method for giving up the mixed manufacturing or allocating a dedicated space to each bogie by defining a space widely may be applied. However, because such method raises investment costs, it is true that the mixed manufacturing of multiple vehicle models is maintained even considering a current amount of interruption.

Therefore, hereinafter, the present disclosure is to propose a method for reducing the duration of the line interruption caused by the proficiency and the mistake of the operator and writing a stable program. This may be changed and applied as a plan to build a realistic intellectualizing plant via definition of various problems and solution exploration in the future.

Figure 5:
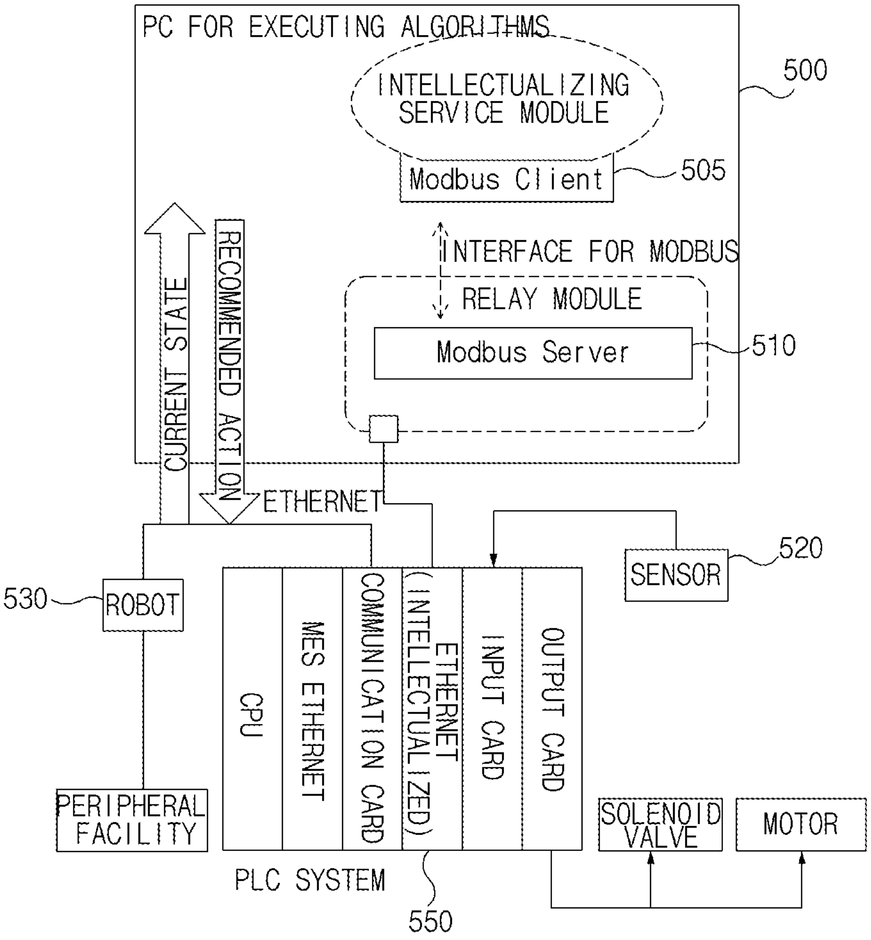
FIG. 5 is a diagram schematically illustrating a vehicle body plant intellectualizing platform system configuration according to an exemplary embodiment of the present disclosure.

FIG. 5 is a diagram schematically illustrating a vehicle body plant intellectualizing platform system configuration according to an exemplary embodiment of the present disclosure.

Referring to FIG. 5, the vehicle body plant intellectualizing platform according to an exemplary embodiment of the present disclosure includes an intellectualizing service module 500, a relay module 510, and an automated PLC system 550.

The intellectualizing service module 500 is not a program that performs simple operation/identification including the PLC ladder, and is characterized by including a set of programs including advanced programs that identify complex line states and store or input answers desired by a user or derive sequential actions based on each state by executing specified algorithms. In an exemplary embodiment of the present disclosure, the intellectualizing service module executes Python algorithms, C++ algorithms, and the like as an example. Furthermore, in another example according to an exemplary embodiment of the present disclosure, the algorithms may further be applied in an expanded manner by being changed into improved new algorithms suitable for user operation in consideration of evolution of an automation system and application of an artificial intelligence (AI)/machine learning (ML) technology.

First, the programmable logic controller (PLC) system 550 according to an exemplary embodiment of the present disclosure will be described. The PLC is responsible for overall operation of the entire lines. Sequence indication data is received via the manufacturing execution system (MES). The PLC system is connected to each peripheral facility and a robot 530 via a communication card. An input card is connected to a sensor and an output card is connected to a solenoid valve, a motor, and the like. A CPU may load various programs such as the ladder, a sequential function chart (SFC), and the like to control the robot, the peripheral facility, the solenoid valve, and the motor based on the sequence indication. Most lines of the PLC system are constructed in such manner, but it is also applicable that different types and entities are added, changed, or expanded based on a technological development.

According to an exemplary embodiment of the present disclosure, the PLC 550 transfers the current state to the intellectualizing service module 500. A type and a number of a bogie for each cell known by the PLC are transferred to the intellectualizing service module 500. When a power supply is installed, an appearance of the bogie may be identified, but when there is no power supply, data managed by the PLC is transmitted.

Accordingly, the intellectualizing service module 500 modifies the ladder program to perform an action. An amount of modification varies depending on how the action is defined, but the ladder program may be written so that the amount of modification of the PLC is minimum. In this regard, because the action is modified/written based on an existing action, there is an advantage that an interlock may also be used as it is.

The relay module 510 according to an exemplary embodiment of the present disclosure is a module for relaying between the PLC and the intellectualizing service module 500, and is a module for connecting the PLC system 550 and the intellectualizing service module 500 to each other. To connect the PLC system 550 and the intellectualizing service module 500 to each other, for example, Python or C++ is installed in a PC to execute the algorithms. Alternatively, the algorithms may be executed by installing an improved program suitable for the user operation in consideration of the evolution of the automation system and the application of the AI/ML technology. The programs may be operated selectively, in combination with specific conditions, or conditionally, in consideration of necessary situations and conditions based on operation of the system.

As described above, the relay module 510, which is an intermediary for transferring the data between the PLC system and the intellectualizing service module installed in the PC, easily connects the PLC and the intellectualizing service module to each other, accurately and rapidly transfers a state of the line provided by the PLC to the intellectualizing service module, and rapidly and accurately delivers an answer to each state derived accordingly by the intellectualizing service module to the PLC. In this regard, a program that supports Modbus, Ethernet communication, and the like, which may transmit an execution confirm result of each step, may be included.

In an exemplary embodiment of the present disclosure, use of a SCADA program without developing a separate program therefor is described. The supervisory control and data acquisition (SCADA) system, which is an arbitration module according to an exemplary embodiment of the present disclosure, connects the PLC and the intellectualizing service module to each other by the communication (the Ethernet, the Modbus, and the like), and installs software inside a SCADA product instead of a PLC-dedicated card to communicate with the intellectualizing service module. In other words, an environment configured for executing various high-level languages including the intellectualizing service module is built inside the SCADA to support process operation more efficiently. This has an advantage of being able to build a universal system which may be connected to the various PLCs even when the existing commercialized SCADA product is applied. The SCADA system is used to control all equipment used on a work site and collect data related to the operation.

Furthermore, several programs have been released based on the SCADA (system monitoring and data collection), and one of those, CIMON's CIMON X, is used as an example in an exemplary embodiment of the present disclosure. That is, the CIMON X described in an exemplary embodiment of the present disclosure is an example, and the present disclosure includes application of a dedicated program, such as the CIMON X, provided by each SCADA maker.

The CIMON X according to an exemplary embodiment of the present disclosure may exchange data with the various types of PLCs. As an exemplary embodiment of the present disclosure, the relay module CIMON X and the intellectualizing service module to which the Python algorithms are applied are in communication with each other via the Modbus. The CIMON X, the relay module, becomes a Modbus server and the intellectualizing service module to which the Python algorithms are applied becomes a Modbus client. Therefore, the data may be exchanged accurately by adding an extension function to the intellectualizing service module to which the Python algorithms are applied.

The PLC system for constructing intelligent line and process according to an exemplary embodiment of the present disclosure selects and transmits necessary data so that the intellectualizing service module to which the Python algorithms are applied defines the current state and the target state, and simply adds an action transmitted by the algorithms to modify the action or perform the added action as a requested action. The operation of the PLC will be described in more detail in an intellectualization flowchart using an interface between the PLC and the intellectualizing service module to which the Python algorithms are applied according to an exemplary embodiment of the present disclosure.

The intellectualizing service module algorithms according to an exemplary embodiment of the present disclosure receive the data delivered by the PLC, define the target state in matrices, and accordingly, more precisely defines the current state→the action→the target state. In other words, the intellectualizing service module algorithms have an advantage of assigning IDs to the states defined in the matrices to determine whether layouts thereof match each other and determining and guaranteeing a method for searching for the current state from the target state, not searching for the target state from the current state, as the fastest path. Furthermore, the algorithms may be executed in all cases, and accordingly, may respond to all the cases which may occur on the line.

Figure 6:
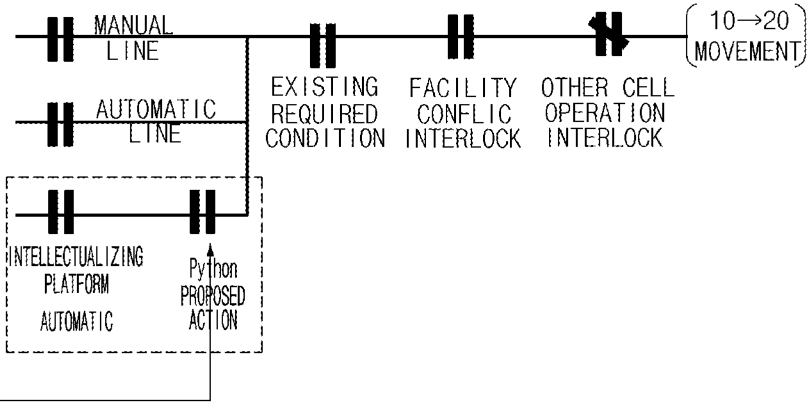
FIG. 6 is a diagram schematically illustrating an intellectualizing operation using an interface between a PLC and an intellectualizing service module according to an exemplary embodiment of the present disclosure.

FIG. 6 is a diagram schematically illustrating an intellectualizing operation using an interface between a PLC and an intellectualizing service module according to an exemplary embodiment of the present disclosure.

Referring to FIG. 6, an interface may be set between the PLC 550 and the intellectualizing service module 500, and a proposed action of the intellectualizing service module, for example, the intellectualizing service module to which the Python algorithms are applied may be connected thereto by the ladder. For example, a number of process 10 bogie may be transmitted to the intellectualizing service module to which the Python algorithms are applied from a PLC address 'DB153. DBD04' via a SCADA address 40003. Thereafter, a PLC address 'DB153. DBD120' may know an action recommended by the intellectualizing service module to which the Python algorithms are applied via a SCADA address 400031. In other words, the line may be stably operated by generating an additional mode by recycling the existing ladder as much as possible.

Figure 7:
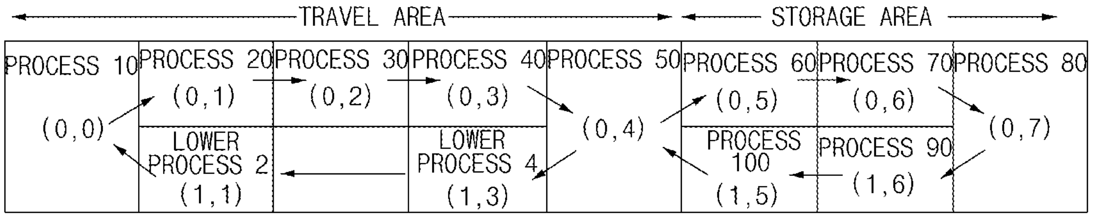
FIG. 7 is a diagram schematically illustrating an intellectualizing operation using coordinate values of each cell according to an exemplary embodiment of the present disclosure.

FIG. 7 is a diagram schematically illustrating an intellectualizing operation using coordinate values of each cell according to an exemplary embodiment of the present disclosure.

Referring to FIG. 7, the intellectualizing service module to which the Python algorithms are applied according to an exemplary embodiment of the present disclosure is described. A problem may be solved by loading appropriate algorithms into the Python. In other words, the Python algorithms which may solve many problems, including the bogie alignment, may be loaded in the linear line system.

As described, the intellectualizing operation according to an exemplary embodiment of the present disclosure includes the set of programs including the advanced programs that identify the complex line states and store or input the answers desired by the user or derive the sequential actions based on each state by executing the specified algorithms and not the program that performs the simple operation/identification including the PLC ladders. The intellectualizing operation may be performed by applying the Python algorithms or the C++ algorithms, and may further be applied in an expanded manner by changing the algorithms into the improved new algorithms based on the evolution of the automation system and the application of the AI/ML technology.

The bogie alignment will be referred to as an example. When each action and the state are determined, the bogie alignment depends on the specific conditions for searching for the shortest path from the current state to the target state and the proficiency of the operator. To solve such problem, the current state and the action may be defined as shown in FIG. 7. The coordinate values of the respective processes may be defined, and actions based on indexes may be defined in a form of <Table 3> corresponding to the respective coordinate values.

TABLE 3

| Index | Travel area action | Storage area action |
|---|---|---|
| 1 | No action | No action |
| 2 | 10–>20 movement | 60–>70 movement |
| 3 | 20–>30 movement | 70–>80 movement |
| 4 | 30–>40 movement | 80–>90 movement |
| 5 | 40–>50 movement | 90–>100 movement |
| 6 | 50–>60 movement | — |
| 7 | 50–>lower4 movement | — |
| 8 | lower4–>lower2 movement | — |
| 9 | lower2–>10 movement | — |
| 10 | 100–>50 movement | — |

Accordingly, the intellectualizing service module may identify the current state and the target state transmitted by the PLC, search for the shortest path therefor, and transmit the index to the PLC suitable for each state.

Figure 8:
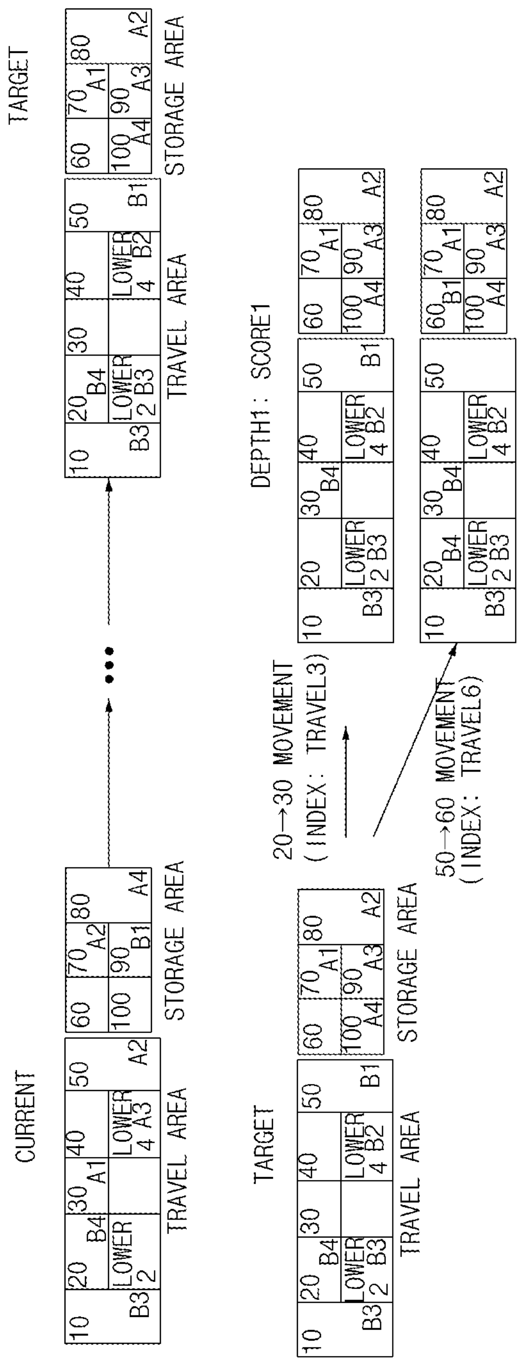
FIG. 8, FIG. 9 and FIG. 10 are diagrams illustrating an intellectualizing operation using an index according to an exemplary embodiment of the present disclosure.
Figure 9:
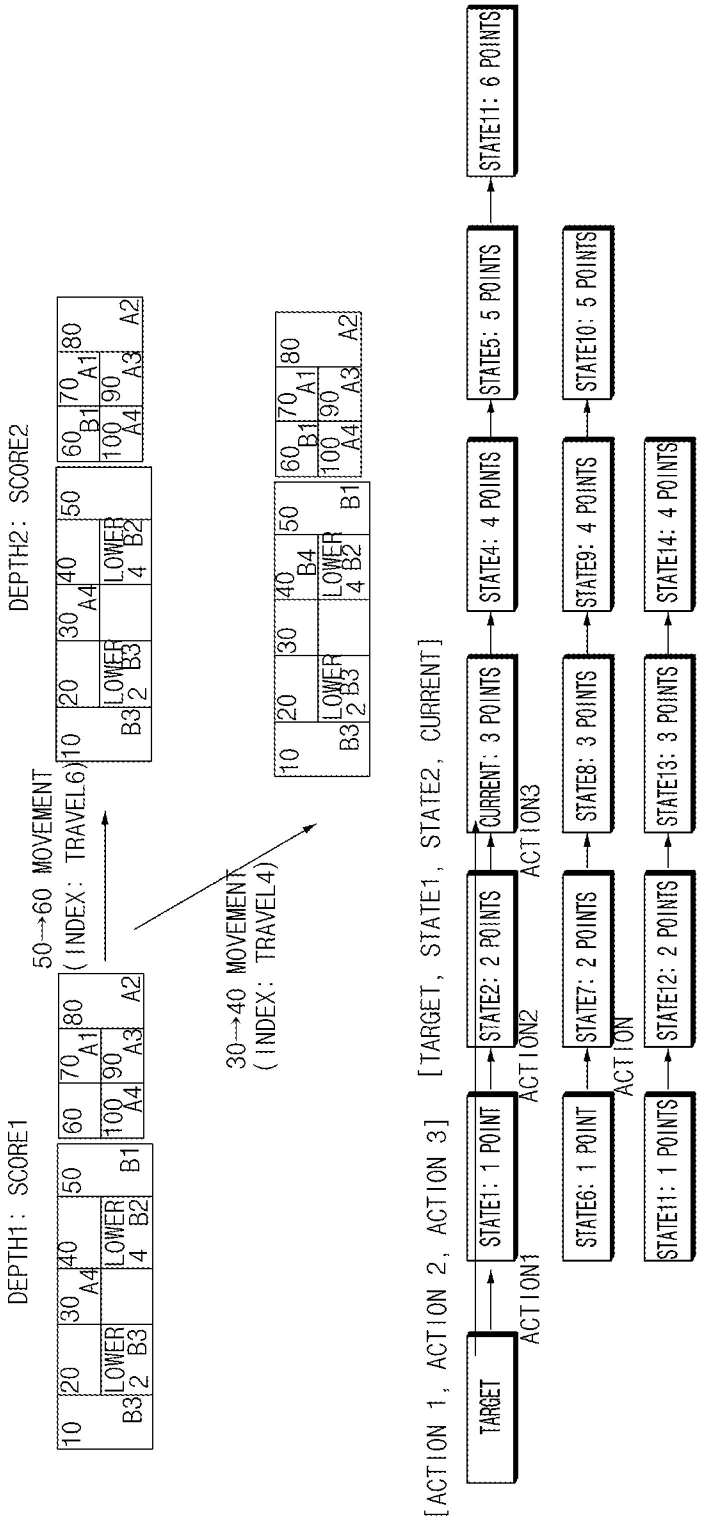
Figure 10:
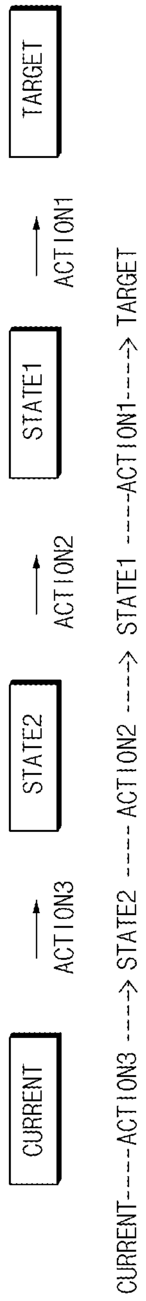

FIG. 8, FIG. 9 and FIG. 10 are diagrams illustrating an intellectualizing operation using an index according to an exemplary embodiment of the present disclosure.

Referring to FIG. 8, as an exemplary embodiment of the present disclosure, when the bogies are mixed with each other, the current state is 30(A1)→70(A2)→lower4(A3)→80(A4)/90(B1)→50(B2)→10(B3)→20(B4), and the target state is 20(B4)→50(B1)→lower4(B2)→lower2(B3)→10(B3)/70(A1)→80(A2)→90(A3)→100(A4), the intellectualizing service module may identify the current state and the target state transmitted by the PLC, search for the shortest path therefor, and transmit the index suitable for each state.

Accordingly, the intellectualizing service module transmits an index travel3 for the travel area action (the 20→30 movement). Accordingly, the target state is set to 30(B4)→50(B1)→lower4(B2)→lower2(B3)→10(B3)/70(A1)→80(A2)→90(A3)→100(A4). Alternatively, the intellectualizing service module transmits an index travel6 for the travel area action (the 50→60 movement). Accordingly, the target state is set to 20(B4)→60(B1)→lower4(B2)→lower2(B3)→10(B3)/70(A1)→80(A2)→90(A3)→100(A4). In this regard, this may be made considering a tree structure for the actions and the states, and FIG. 8 illustrates a case of a depth of 1 and a score of 1.

Referring to FIG. 9, in the case of the depth of 1 and the score of 1, the intellectualizing service module may transmit the index travel6 for the travel area action (the 50→60 movement) to set the target state to 30(B4)→60(B1) →lower4(B2)→lower2(B3)→10(B3)/70(A1)→80(A2) →90(A3)→100(A4) for the current state 30(B4)→50(B1) →lower4(B2)→lower2(B3)→10(B3)/70(A1)→80(A2) →90(A3)→100 (A4). In the instant case, a depth of 2 and a score of 2 are set. Alternatively, the intellectualizing service module may transmit an index travel4 for the travel area action (the 30→40 movement) to set the target state to 40(B4)→50(B1)→lower4(B2)→lower2(B3)→10(B3)/70 (A1)→80(A2)→90(A3)→100(A4).

As shown in FIG. 9, when all of the actions are searched, the tree of the actions and the states for the current state from the target state may be generated. When the state desired by the user is the current state, the fastest path may be identified by finding the current state in the tree and going up reversely.

As described, when there are the target state and the current state, an order of the actions is [action1, action2, action3], and states corresponding thereto are [target, state1, state2, current]. Inverted current state→target state is the answer target by the user.

Referring to FIG. 10, it may be seen that a procedure proceeds current→action3→state2→action2→state1→action1→target. Therefore, because the order of the actions is reversed from that at a time of determination, a correct index is selected by reversing the order from the current state to the target state.

Figure 11:
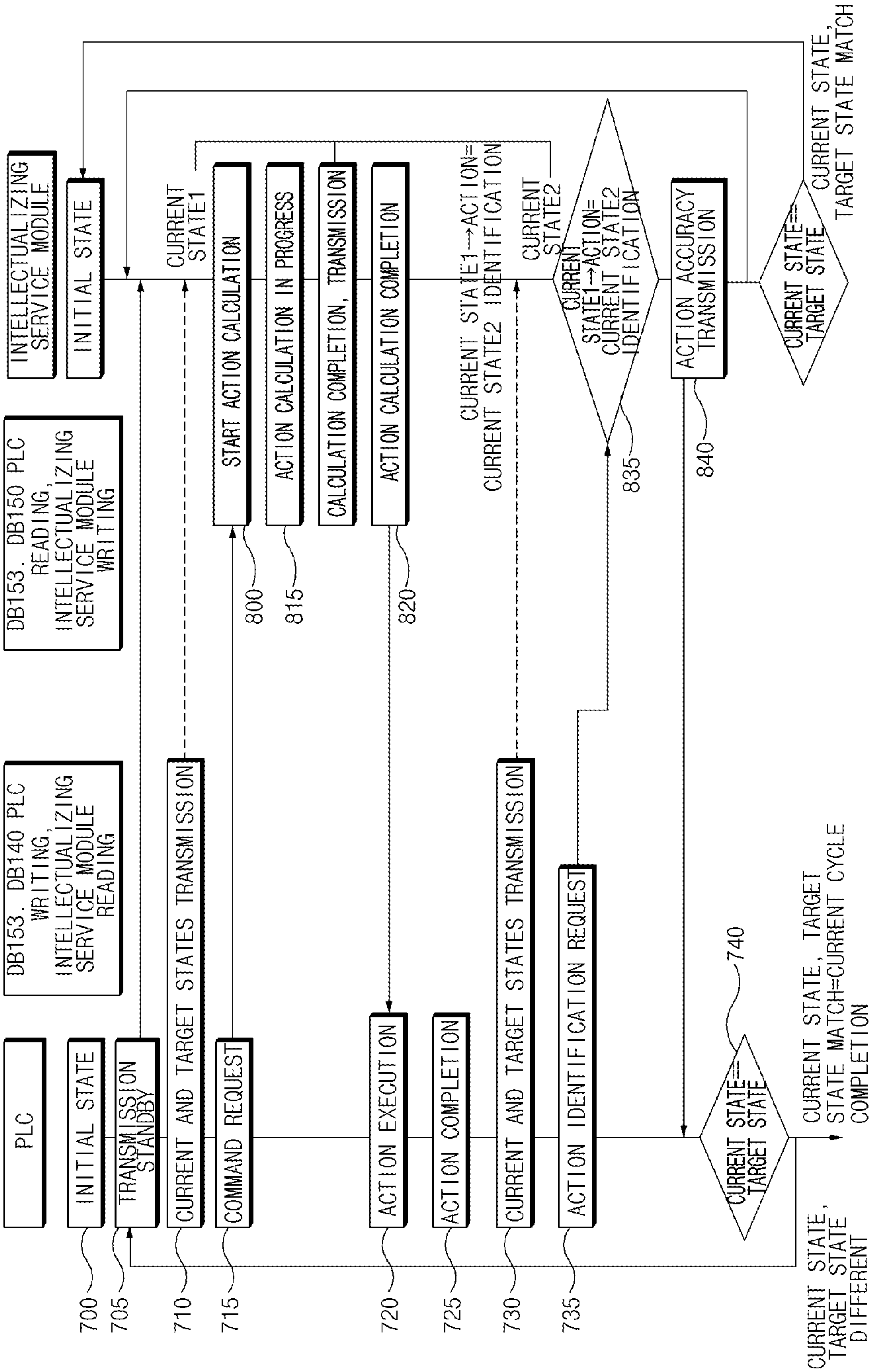

FIG. 11 and FIG. 12 are diagrams illustrating an intellectualizing operation using an interface between a PLC and an intellectualizing service module according to an exemplary embodiment of the present disclosure. Here, as an exemplary embodiment of the present disclosure, the intellectualizing service module may include the intellectualizing service module to which the Python algorithms are applied.

Referring to FIG. 11, the PLC checks the data throughout the system to operate the entire lines in an initial state (700). In a transmission standby state (705), the PLC checks the data to transfer the known bogie type and number of each cell to the intellectualizing service module. Thereafter, the PLC transfers the current state and the target state to the intellectualizing service module (710). For example, the PLC writes 'DB153. DB140' and causes the intellectualizing service module to read the same (715).

The intellectualizing service module identifies a request transmitted from the PLC in an initial state. Accordingly, the intellectualizing service module starts determining an action for a current state1 in consideration of the request (800), then writes 'DB153. DB150' during the action determination to complete the determination, and then causes the PLC to read the same (815). Thereafter, the intellectualizing service module completes the action determination (820) and transfers the action for the PLC to perform (720).

Accordingly, the PLC is configured to perform the action for stably operating the line in consideration of the action recommended by the intellectualizing service module (725). At the instant time, the PLC transfers the action completed current state and the target state to the intellectualizing service module (730). This is to cause the intellectualizing service module to identify the current state and the target state transmitted by the PLC, search for the shortest path therefor, and deliver it to the PLC suitable for each state. That is, the PLC requests the intellectualizing service module to identify the action (735). Accordingly, the intellectualizing service module identifies a received current state2 and determines an action (835). The intellectualizing service module identifies current state1→action3=current state2 and transmits a result on whether the action is accurate (840).

The PLC identifies that the current state is set to be the target state by identifying information on the accuracy of the action transmitted from the intellectualizing service module (740). Here, when it is identified that the current state matches the target state, the current cycle is completed. On the other hand, when it is identified that the current state and the target state are not the same as each other, the PLC returns to the transmission standby (705) and is configured to perform an operation for transmitting information on the current state and the target state to the intellectualizing service module. The intellectualizing service module also returns to the initial state when it is identified that the current state matches the target state after transmitting the accuracy information on the transferred action result.

In the exemplary embodiment of the present disclosure, the reason why the PLC requests the intellectualizing service module to identify the action is to prevent the PLC from not knowing the entire states and the actions. Via the action identification request of the PLC (735), the state change tree for the current state, the target state, and the actions is identified to operate the line more precisely and small mistakes and errors are identified at a time of occurrence, which is an early stage, to prevent the occurrence of the long interruption. Furthermore, the transmission of the information 840 on the accuracy of the action of the intellectualizing service module provides the information on the current state, the action, and the target state to the PLC, operating the PLC more stably via reliability information on the determination of the intellectualizing service module. Therefore, the line may be operated more accurately and stably by considering an action mode added via the action identification request and the action result transmission between the PLC and the intellectualizing service module.

Referring to FIG. 12, the addresses of the PLC and the SCADA are illustrated. When the PLC writes a process 10 bogie model with an address DB153.DB00, a relay writes a SCADA address 40001 for the PLC address DB153.DB00. When the SCADA address 40001 is transmitted to a specific port, the intellectualizing service module becomes the Modbus client and reads the data to know the 10 process model.

A following <Table 4> is a code example, and the SCADA and the intellectualizing service module are able to exchange the data with each other. Therefore, the intellectualizing service module and the relay CIMON X are in the same PC and are able to be operated by assigning a specific number to SERVER_PORT.

TABLE 4

```
from pyModbusTCP.client import ModbusClient
  def polling_thread(self):
    c = ModbusClient(host=self.SERVER_HOST,
port=self.SERVER_PORT, auto_open=True)
      # polling loop
      while self.state:
              c. write_multiple_registers(38, write)
                  ...
                c. write_multiple_registers(36, Moving_line_cmd)
                  ...
                c. write_multiple_registers(42, Storage_line_cmd)
          # do modbus reading on socket
        reg_list = c.read_holding_registers(0, 32)
```

As described, the platform for applying the vehicle body intellectualization according to an exemplary embodiment of the present disclosure includes the PLC system, the intellectualizing service module, and the relay module that relays between the PLC and the intellectualizing service module to operate the line more stably and accurately.

As an exemplary embodiment of the present disclosure, considering a reality that most automation plants, including that of the vehicle bodies, include the PLC and a dedicated facility, a ladder circuit that operates the PLC is based on a past wiring diagram, so that anyone can use it easily. In this regard, the program is written only for limited cases in consideration of a reality of not being able to be applied to complex and various conditions.

With the platform according to an exemplary embodiment of the present disclosure, various problems may be solved when an application process is in the field. This solves many limitations in building the intellectualized plant in the current system, and has an advantage that a person in charge may define problems, search for accurate solutions, and find the solution more easily. This may solve a problem of belonging to a specific PLC family and not being able to be applied to a PLC used by other companies. That is, the method provided in an exemplary embodiment of the present disclosure is economically useful because consistent hardware may be applied to all PLCs and a cost may also be reduced.

Figure 13:
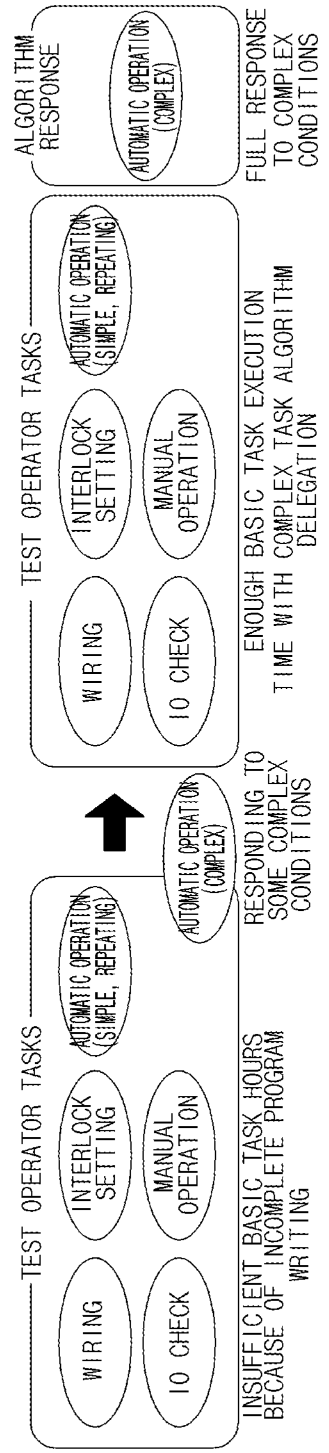
FIG. 13 is a diagram illustrating advantages of an intellectualization procedure using an interface between a PLC and an intellectualizing service module according to an exemplary embodiment of the present disclosure.

Furthermore, the process operation according to an exemplary embodiment of the present disclosure has an advantage of leading to reduction in an amount of programming. This is as shown in FIG. 13. FIG. 13 is a diagram illustrating advantages of an intellectualization procedure using an interface between a PLC and an intellectualizing service module according to an exemplary embodiment of the present disclosure.

Referring to FIG. 13, in a current line setup step, the test operator is configured to determine whether wires are accurately connected to each other, manually manipulates each unit, and writes an automatic operation program. The wiring, IO check, and the manual manipulation of each unit are essential tasks when constructing the facility. However, because there are too many variables that determine a line environment, it is impossible to write all of automatic programs responding thereto. Therefore, among various situations, a few conditions which may manufacture products stably are specified, and only automatic operation programs corresponding thereto are written to set up the line. Based on such process, the operator responds to various problems which may occur during the line operation. In the case of applying the operating method described in FIG. 5, FIG. 6, FIG. 7, FIG. 8, FIG. 9, FIG. 10, FIG. 11 and FIG. 12 according to an exemplary embodiment of the present disclosure, an advantage that the operator solves the problem with the manipulation of each unit when the bogie mixing (twisting) problem occurs is provided. In other cases, when one unit installed in a complex jig is located in a state not defined by the program, compared to a solving method in which the operator identifies the state, forcibly disconnects the interlock and performs manual manipulation, or directly presses the solenoid, there are advantages of preventing the test operator from being burdened to consider various problems and from writing unnecessary ladders. Furthermore, a problem of poor program quality caused by lack of time because of the unnecessary ladder writing is also solved.

As described above, it is important to accurately check the interlock for preventing a collision between the facilities. When writing the program considering the various conditions, it often happens that the interlock check is not properly performed and the facilities collide with each other. According to an exemplary embodiment of the present disclosure, the facility test operators may spend a lot of time on the wiring condition check, the accurate IO check, and the check of the interlock of important sections between the facilities, which are the most important and basic tasks. Furthermore, by allowing the algorithms to cope with the complex automatic operation, time spent writing unnecessary and inaccurate automatic operation program may be reduced.

Furthermore, there is an advantage of reducing the amount of interruption because of not being affected by the operator skill. For example, in the case of a complex line, operator determination is essential when the line is interrupted. The amount of interruption is mostly determined by the determination made by the operator at the early stage. In the case of a plant that performs the mixed manufacturing, there are many bogies and a manufacturing ratio is frequently changed, so that the experienced operator may wrongly determine the situation. However, when the intelligent procedure using the interface between the PLC and the intellectualizing service module according to an exemplary embodiment of the present disclosure is applied, the amount of interruption may be dramatically reduced for the defined problem. In other words, the algorithms may guarantee that the action based on each state is always correct and the mistake in each step that may be made by the operator may be prevented via the action identification request from the PLC and the action result transmission of the intellectualizing service module. As a result, the operator proficiency does not greatly affect the amount of interruption, so that the line may be more accurately and efficiently designed.

Figure 14:
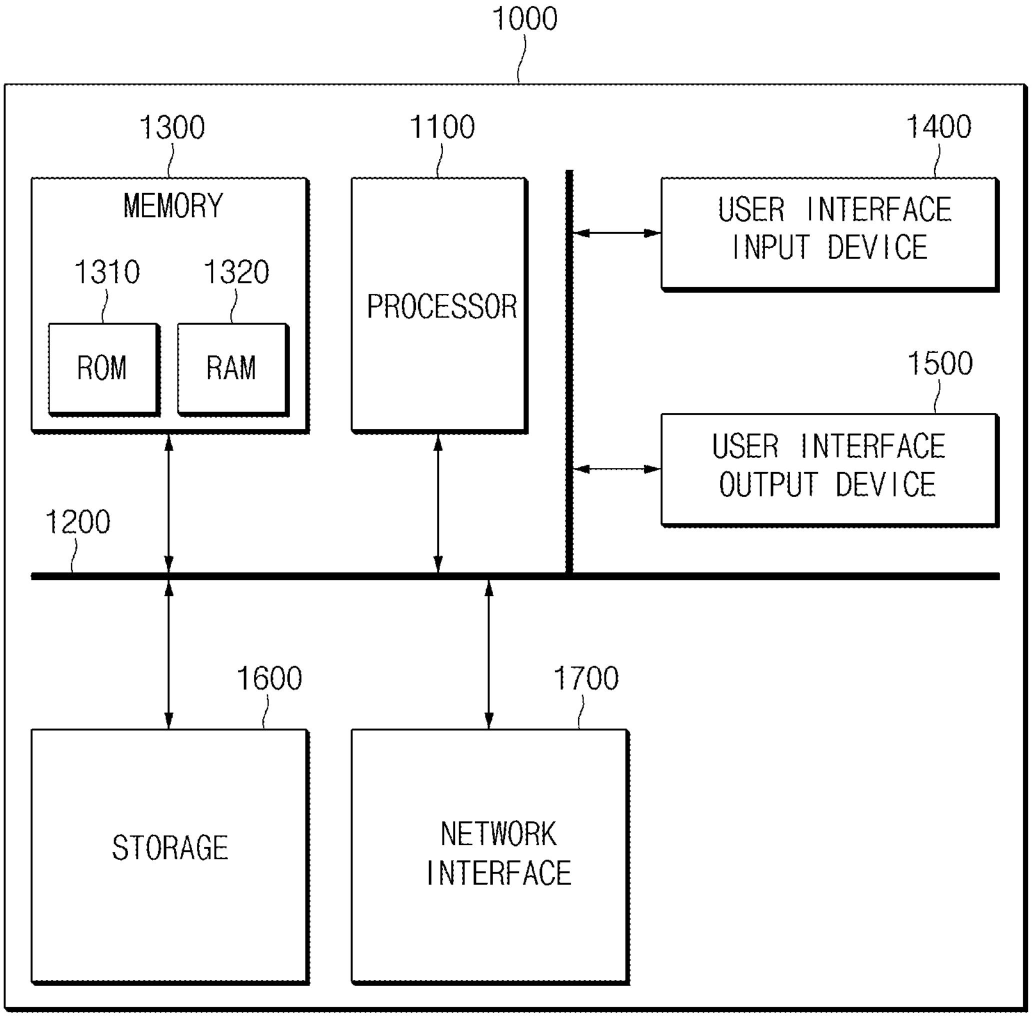
FIG. 14 illustrates a computing system according to an exemplary embodiment of the present disclosure.

FIG. 14 illustrates a computing system according to an exemplary embodiment of the present disclosure.

With reference to FIG. 14, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that is configured to perform processing on commands stored in the memory 1300 and/or the storage 1600. The memory 1300 and the storage 1600 may include various types of volatile or non-volatile storage media. For example, the memory 1300 may include a Read-Only Memory (ROM) and a Random Access Memory (RAM).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments included in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The platform for the application of vehicle body intellectualization according to an exemplary embodiment of the present disclosure provides the advantage of more stably and accurately operating/managing the process line via the PLC system, the intellectualizing service module, and the relay module. The platform solves the problem of belonging to the specific PLC family and not being able to be applied to the PLC used by other companies, that is, applies the consistent hardware to all of the PLCs to reduce the overall system operation costs, achieving economical line process operation.

Furthermore, the platform for the application of the vehicle body intellectualization according to an exemplary embodiment of the present disclosure induces the reduction in the amount of programming to reduce unnecessary time for the algorithms to cope with the complex automatic operation and to reduce time used to write the inaccurate automatic operation program. Furthermore, there is the advantage of reducing the amount of interruption caused by the small errors because of not being affected by the proficiency and the skill of the operator. Finally, there is an advantage of improving productivity by mixing the plurality of models with each other without increasing investment costs.

Furthermore, various effects identified directly or indirectly through the present specification may be provided.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for performing an intellectualizing process, the apparatus comprising:

a programmable logic controller (PLC) system configured for managing line operation;

an intellectualizing service module configured for identifying information transmitted from the PLC system to define an action and transmitting information on the action to the PLC system; and a relay module configured for providing an interface by establishing communication between the PLC system and the intellectualizing service module, wherein the information transmitted from the PLC system is data about a current state, and the information on the action is data about a recommended action for the current state, and wherein the relay module is configured to connect the PLC system and the intellectualizing service module to each other via the communication; and wherein the PLC system is further configured to:

transmit data on the current state including a bogie type and a bogie number for each process position in a manufacturing line or a storage line as a cell to the intellectualizing service module;

receive the recommended action corresponding to the data on the current state from the intellectualizing service module;

add the recommended action to a ladder;

perform the action; and transmit an action identification request including information on the current state and a target state to the intellectualizing service module after performing the recommended action, and wherein the intellectualizing service module is further configured to:

transmit, to the PLC system in response to the action identification request, accuracy information including information on the current state, the recommended action, and the target state, and wherein the communication includes Ethernet communication and Modbus.

2. The apparatus of claim 1, wherein the relay module is configured to utilize a program for performing supervisory control and data acquisition (SCADA) to transfer the data between the PLC system and the intellectualizing service module, wherein the relay module and the intellectualizing service module are in communication with each other via the Modbus, and wherein the relay module becomes a server of the Modbus and the intellectualizing service module becomes a client of the Modbus.

3. The apparatus of claim 1, wherein the intellectualizing service module is further configured to define coordinate values corresponding to positions of respective processes and to define an index corresponding to each of the coordinate values, and wherein the index is defined as an index for identifying an action corresponding to movements in actions of a travel area and a storage area, and wherein the intellectualizing service module is configured to:

transmit the index suitable for the current state to the PLC system.

4. The apparatus of claim 1, wherein the intellectualizing service module is configured to:

identify the current state and the target state transmitted from the PLC system and identify a shortest path by searching reversely from the target state to the current state to minimize the number of actions; and deliver an index suitable for corresponding states to the PLC system.

5. The apparatus of claim 1, wherein the intellectualizing service module is further configured to construct a tree structure for actions and states for the current state and to identify a shortest path.

6. The apparatus of claim 1, wherein the intellectualizing service module is further configured to operate at least one of Python algorithms, C++ algorithms, and advanced algorithms considering application of an advanced automation system and an artificial intelligence (AI) and machine learning (ML) technology.

7. The apparatus of claim 1, wherein the PLC system is configured to receive sequence indication data via a manufacturing execution system (MES).

8. The apparatus of claim 7, wherein the PLC system is connected to a peripheral facility and a robot via a communication card, and wherein an input card is connected to a sensor and an output card is connected to a solenoid valve and a motor.

9. The apparatus of claim 8, wherein the PLC system is configured to load the ladder and a sequential function chart (SFC) program to control the robot, the peripheral facility, the solenoid valve, and the motor based on the sequence indication data.

10. A method for performing an intellectualizing process, the method comprising:

transmitting, by a programmable logic controller (PLC) system, information on a current state and a target state to an intellectualizing service module;

identifying, by the intellectualizing service module, the current state and the target state of the PLC system via the information, determining an action corresponding to the information, and transmitting information on the action to the PLC system;

executing, by the PLC system, the action based on the information on the action and transmitting action identification information including the completed current state and the target state to the intellectualizing service module;

transmitting, by the intellectualizing service module, accuracy information on a result of the action to the PLC system corresponding to the action identification information;

transmitting, by the PLC system, an action identification request including information on the current state and the target state to the intellectualizing service module after performing a recommended action; and transmitting, by the intellectualizing service module, to the PLC system in response to the action identification request, accuracy information including information on the current state, the recommended action, and the target state.

11. The method of claim 10, wherein the information on the current state and the target state includes a bogie type and a bogie number for each process position in a manufacturing line or a storage line as a cell identified by the PLC system.

12. The method of claim 11, wherein the information on the action includes information on a shortest path determined by identifying the current state and the target state, wherein the shortest path is identified by searching reversely from the target state to the current state to minimize the number of actions.

13. The method of claim 12, wherein the information on the action includes identifying of the shortest path by constructing a tree structure for actions and states for the current state.

14. The method of claim 12, wherein the information on the action defines coordinate values for respective processes and defines an index corresponding to each of the coordinate values, and wherein the index is defined as an index distinguished corresponding to actions of a travel area and a storage area.

15. The method of claim 10, further including:

identifying, by the PLC system, that the current state matches the target state by identifying the accuracy information on a result of the action transmitted from the intellectualizing service module.

16. The method of claim 15, wherein the intellectualizing service module is configured to operate at least one of Python algorithms, C++ algorithms, and advanced algorithms considering application of an advanced automation system and an artificial intelligence (AI) and machine learning (ML) technology.

17. The method of claim 10, further including:

connecting the PLC system and the intellectualizing service module to each other via communication, wherein the communication includes Ethernet communication and Modbus, wherein the connecting of the PLC system and the intellectualizing service module to each other involves a relay module to transfer data between the PLC system and the intellectualizing service module, and wherein the relay module is configured to utilize a program for performing supervisory control and data acquisition (SCADA), wherein the relay module and the intellectualizing service module are in communication with each other via Modbus, wherein the relay module becomes a server of the Modbus and the intellectualizing service module becomes a client of the Modbus.

18. The method of claim 17, further including:

writing, by the PLC system, a PLC address;

generating, by the relay module, an address of the relay module from the PLC address; and transmitting the address of the relay module, wherein the intellectualizing service module becomes the client of the Modbus and reads data on the address of the relay module to identify the PLC address.

* * * * *